July 31, 1923.
M. E. THEISS
EMBLEM HOLDER FOR AUTOMOBILE FENDERS
Filed Jan. 14, 1922
1,463,409
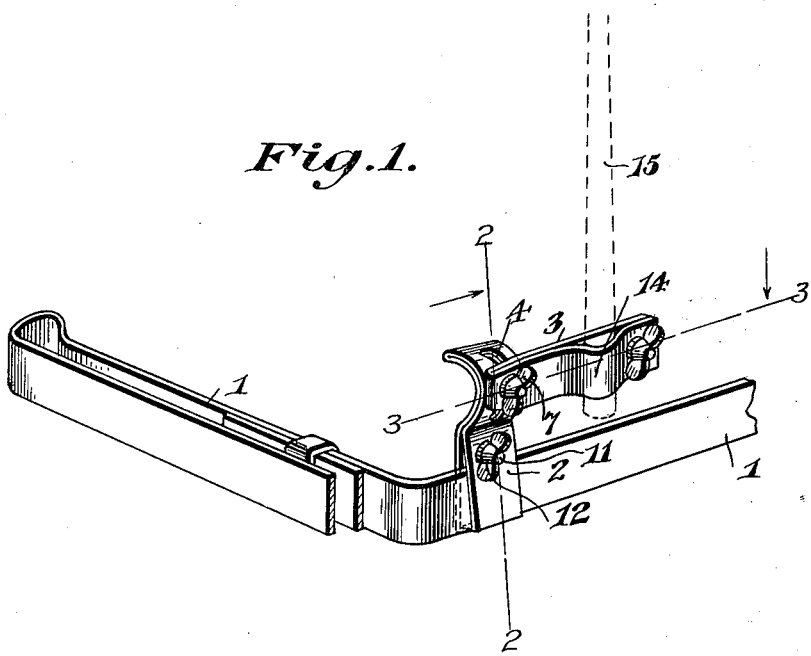
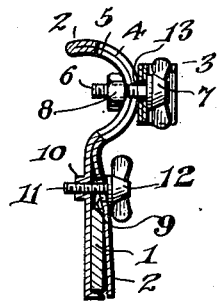
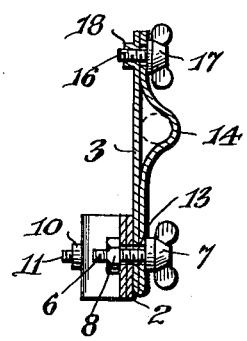
Mary E. Theiss, INVENTOR.
BY Geo. P. Kimmel, ATTORNEY.

Patented July 31, 1923.

1,463,409

UNITED STATES PATENT OFFICE.

MARY E. THEISS, OF WARRENSBURG, MISSOURI.

EMBLEM HOLDER FOR AUTOMOBILE FENDERS.

Application filed January 14, 1922. Serial No. 529,279.

*To all whom it may concern:*

Be it known that I, MARY E. THEISS, a citizen of the United States, residing at Warrensburg, in the county of Johnson and State of Missouri, have invented certain new and useful Improvements in Emblem Holders for Automobile Fenders, of which the following is a specification.

This invention has reference to emblem holders for automobile fenders and its object is to provide a device which may be attached directly to an automobile fender and hold the emblem rigidly in position for display. The emblem holder is so constructed as to be attached directly to the fender in such manner as to be readily adjusted in the desired position.

In accordance with the invention, the emblem holder comprises a clamp adapted to either a straight or inclined automobile fender and may be readily placed in such manner that the emblem post is held in an upright position. In order to facilitate the attachment of the emblem holder, it is made in two parts readily clamped in position by means of thumb screws and provision is made for such adjustment as may be necessary.

The invention will be best understood from a consideration of the following detailed description taken in connection with the accompanying drawings forming part of the specification with the understanding that the invention is not confined in its practical embodiment to any strict conformity with the showing of the drawings but may be changed and modified so long as such changes and modifications mark no material departure from the salient features of the invention as expressed in the attached claims.

In the drawings:—

Figure 1 is a perspective view of the emblem holder attached to an automobile fender, Fig. 2 is a section on the line 2—2 of Fig. 1, Fig. 3 is a section on the line 3—3 of Fig. 1.

Referring to the drawings, there is shown a portion of an automobile fender 1 of any appropriate form and therefore not described in detail.

The emblem holder comprises two clamp members 2 and 3 arranged at right angles one to the other. The clamp 2 is formed of an elongated narrow strip of sheet metal bent upon itself intermediately of its length, the metal strip being of spring metal so as to have a normal tendency to separate. The clamp member 2 is relatively narrow and of double thickness with one end bent upon itself into a curve of arcuate shape indicated at 4, and lengthwise to this curved portion 4 is a longitudinal slot 5 formed in both members of the curve to receive a screw 6 terminating at one end in a thumb screw 7 and at the other end traversing a nut 8 lodged in the concaved side of the curve 4. Beyond the curve 4 the two members of the clamp 2 have a natural tendency to spread apart so as to readily embrace the fender 1 lodged between them. One member of clamp 2 has a passage 9 through it and the other member of the clamp 2 has a nut 10 formed thereon to give sufficient body for the stem 11 pressed on the thumb screw 12 whereby the two expanding members of the clamp 2 where embracing the fender 1 have abundant bearing to draw the clamp 2 into firm engagement with the fender 1.

The thumb screw stem 6 traversing the slot 4 and provided with the clamp nut 8 also passes through the clamp 3 pierced by a perforation 13 to accommodate the stem 6, such perforation being located near one end of the clamp 3. The clamp 3 is formed of a single strip of spring metal bent upon itself intermediately of its length and at the end remote from that traversed by the thumb screw stem 6 is provided with a curved portion 14 so as to bend away from the other half of the clamp 3 to accommodate a stem 15 of an emblem holder, but this stem is merely indicated in the drawings in Figs. 1 and 3 in dotted lines.

Adjacent to the outer end of the clamp 3 it is traversed by the stem 16 of a thumb screw 17 and this stem has a bearing in a nut 18 to give ample support for the stem 16. The construction is such that the thumb screw 17 will force the curved portion 14 firmly against the post 15 and thus clamp the post 15 against accidental displacement in any desired position of adjustment.

In an automobile it is of course important that the emblem holder should be firmly held in any desired position of adjustment and this adjustment should be changeable at will and also be resistant to any accidental displacement which might be caused under the exigencies of use.

When it is desirable to readjust or change the emblem, it is only necessary to loosen either or both of the thumb screws traversing the clamps 2 and 3 and after the adjustments have been made, the clamps may be readily tightened in position by the proper manipulation of the thumb screws.

The construction of the clamp 2 is such that it may be rocked about a horizontal axis due to the presence of the curved slot 4, while the clamp 2 may be shifted lengthwise of the fender 1.

What is claimed is:—

1. An emblem holder for automobile fenders comprising an upright clamp formed of a single narrow strip of sheet metal returned upon itself, with the doubled strip curved through the return portion and there slotted longitudinally, a clamp screw traversing the slot, and another clamp member comprising a narrow strip of sheet metal returned upon itself to constitute a flag-staff holder and capable of being made fast to the first named clamp in adjusted position.

2. An emblem holder adapted to be attached to an automobile fender, comprising an upright clamp, and a horizontal clamp associated therewith, said clamps being each formed of a narrow strip of sheet metal folded upon itself, one of the folded strips being traversed at each of opposite ends by a binding clamp screw to force the clamp into engagement with an emblem carrying flag staff to hold it, and the upright clamp having one end formed with a normally expanding portion traversed by a clamp screw and the other end curved and longitudinally slotted and also traversed by a clamp screw holding the two clamps together in adjusted position.

In testimony whereof, I affix my signature hereto.

MARY E. THEISS